No. 764,068. PATENTED JULY 5, 1904.
E. H. PALMER.
CALCULATING MECHANISM.
APPLICATION FILED AUG. 30, 1902.
NO MODEL. 6 SHEETS—SHEET 3.

Witnesses. Inventor.
E. H. Palmer

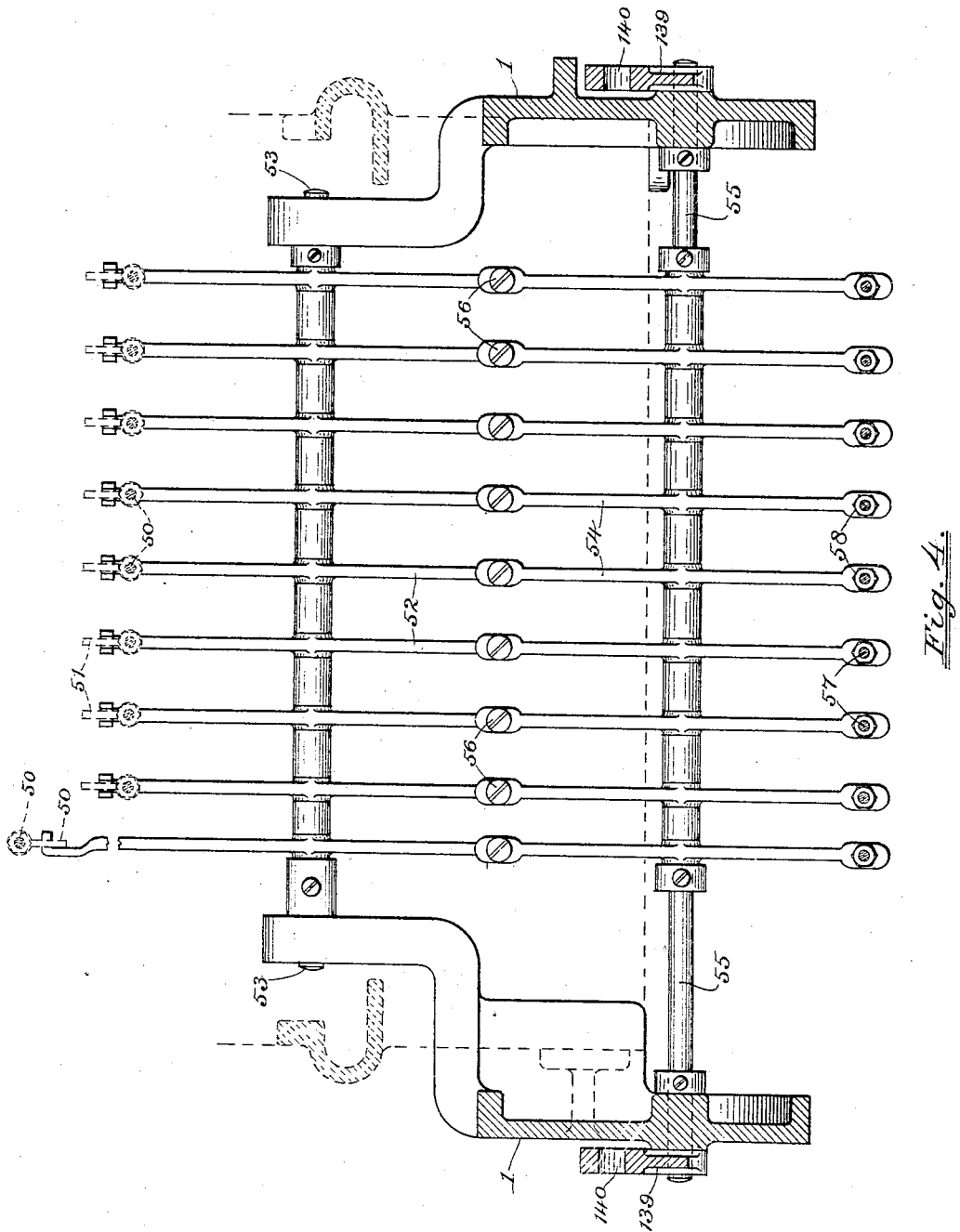

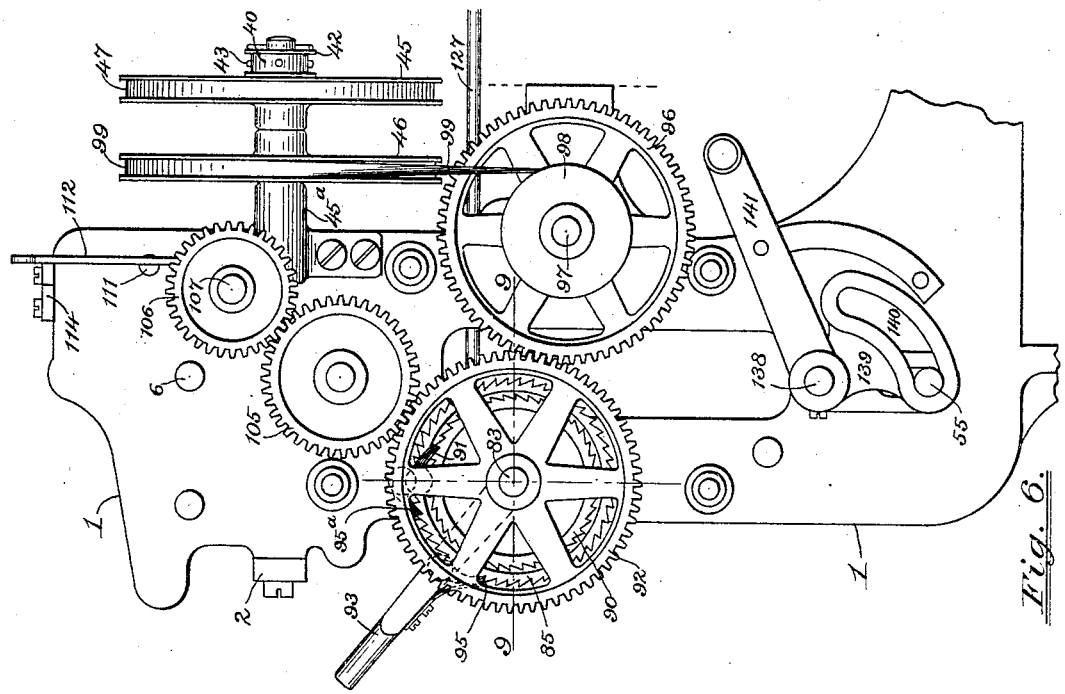

No. 764,068. PATENTED JULY 5, 1904.
E. H. PALMER.
CALCULATING MECHANISM.
APPLICATION FILED AUG. 30, 1902.
NO MODEL. 6 SHEETS—SHEET 6.

Witnesses.
Samuel G. Stephens.
A. D. Harrison.

Inventor.
E. H. Palmer
by Wight Brown & Quinby
Attys.

No. 764,068. Patented July 5, 1904.

UNITED STATES PATENT OFFICE.

EDWARD H. PALMER, OF READING, MASSACHUSETTS.

CALCULATING MECHANISM.

SPECIFICATION forming part of Letters Patent No. 764,068, dated July 5, 1904.

Application filed August 30, 1902. Serial No. 121,633. (No model.)

*To all whom it may concern:*

Be it known that I, EDWARD H. PALMER, of Reading, in the county of Middlesex and State of Massachusetts, have invented certain new and useful Improvements in Calculating Mechanism, of which the following is a specification.

This invention relates to calculating mechanism suitable for operation in connection with type-writing machines or for independent use, and has for its object the production of mechanism, preferably as an attachment for such machines, whereby addition or subtraction may be performed and the results exhibited simultaneously with the writing on a sheet of paper of the numerals which are to be added or subtracted.

A further object of the invention is the production of mechanism of this character which may be quickly rendered temporarily inoperative in order that the result exhibited may be written on the paper by the type-writing machine without actuating the number-wheels or so that the said type-writing machine may be used in the ordinary manner, the same as if the attachment were not present.

A further object of the invention is the production of calculating mechanism operated by power, such as that which may be stored in a spring, which power is renewed or generated by the return movement of the type-writer carriage, whereby the operator is relieved of physical effort materially adding to that required in the ordinary use of the keys.

Further objects of the invention are simplicity of construction and accuracy of operation, all as will more fully appear hereinafter.

The invention consists in the construction and combination of the parts whereby the above-named objects are accomplished substantially as hereinafter described and claimed.

Figure 1:
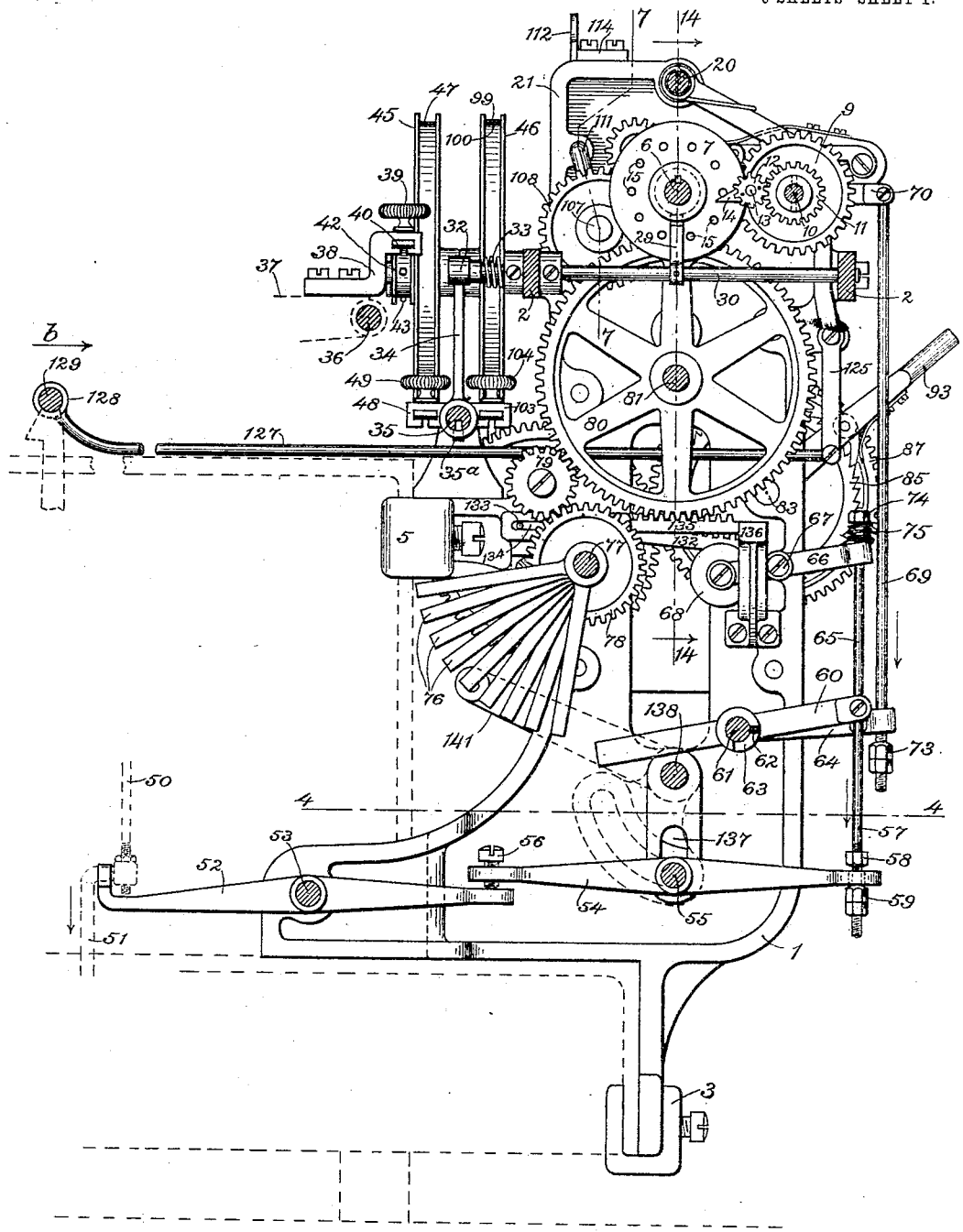
Figure 2:
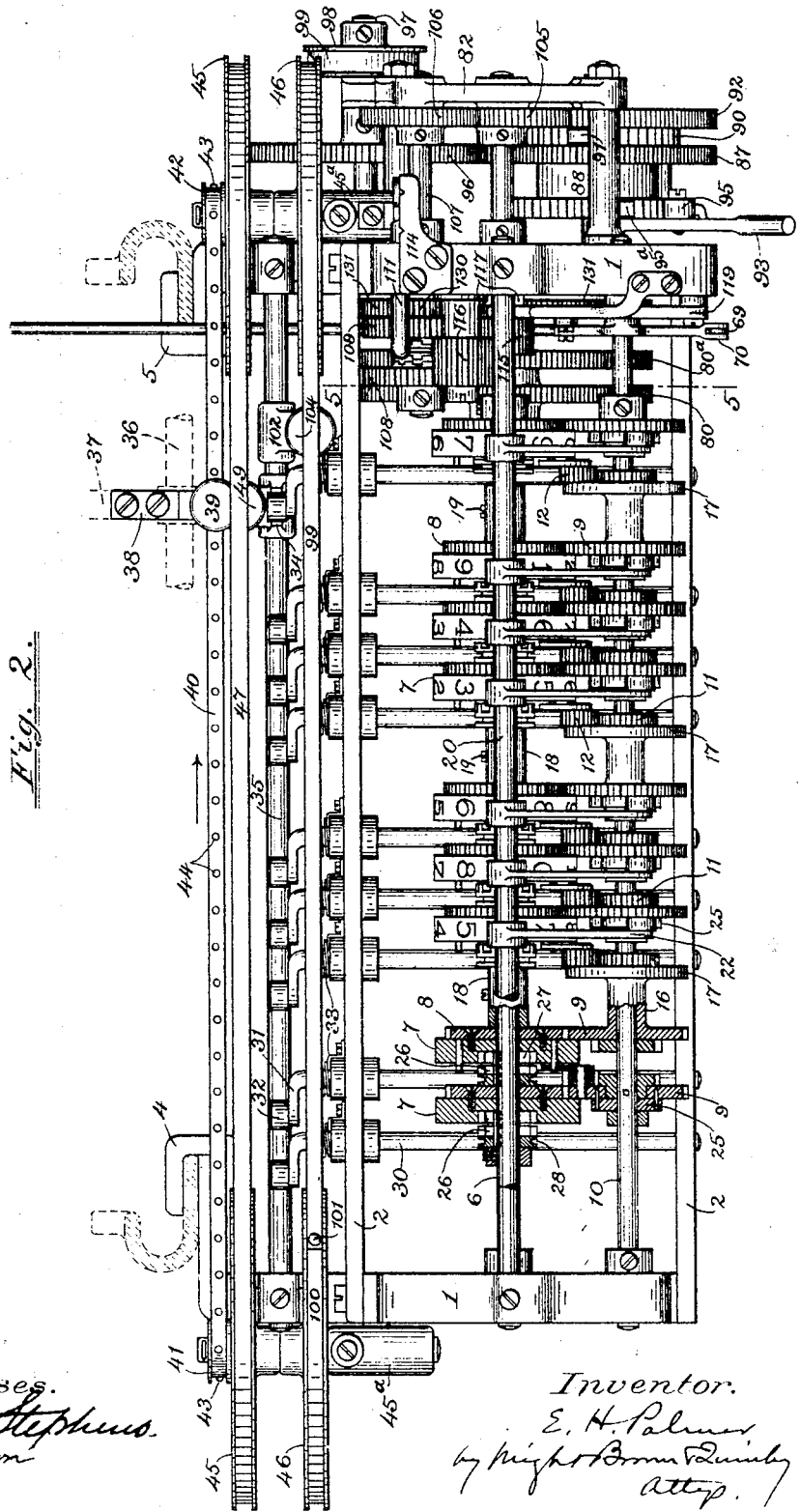
Figure 3:
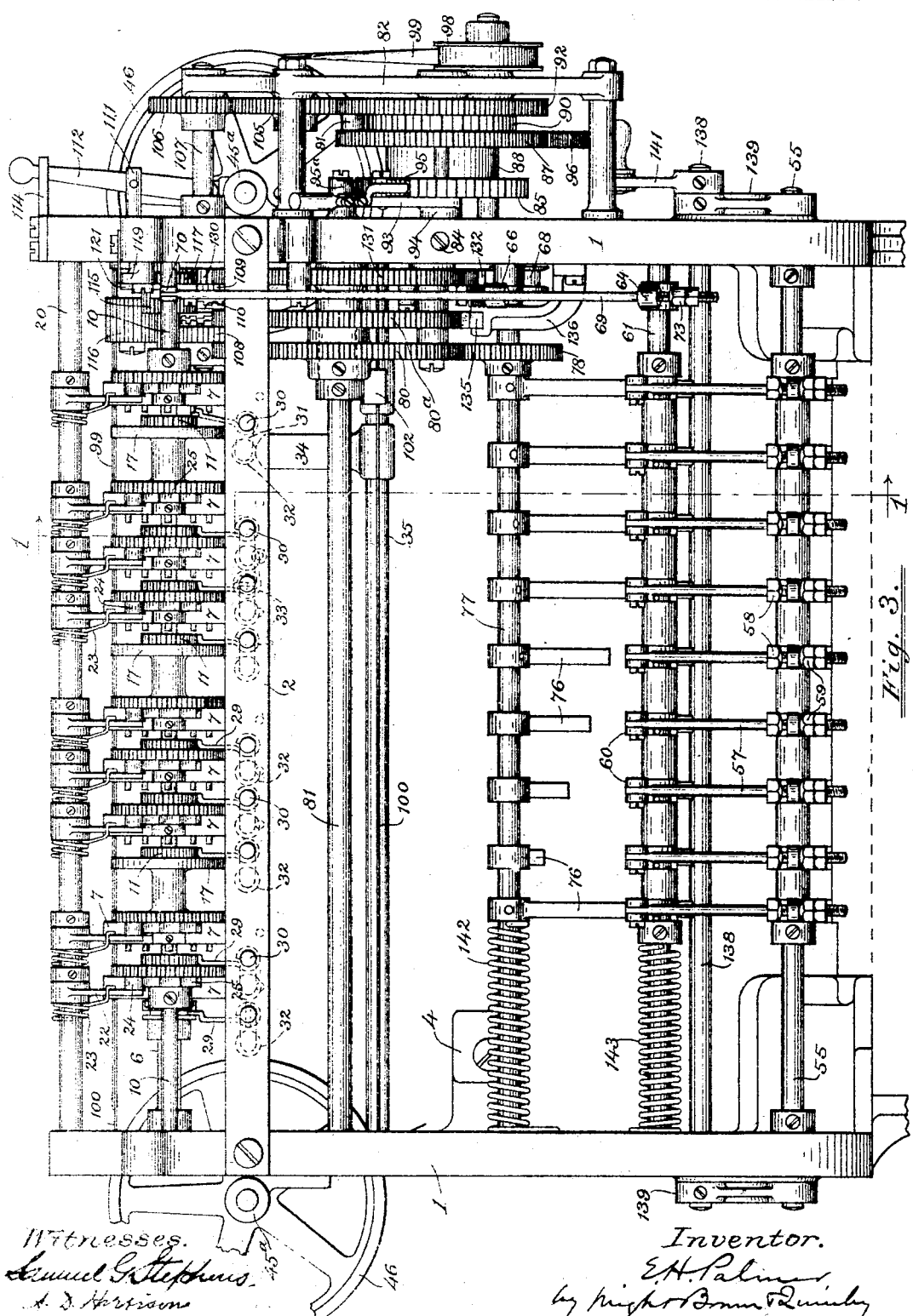
Figure 7:
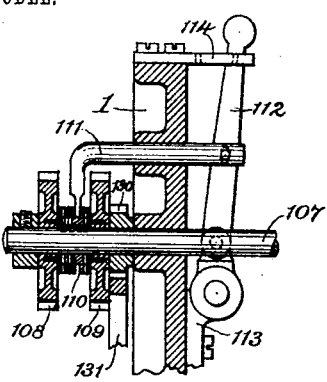
Figure 8:
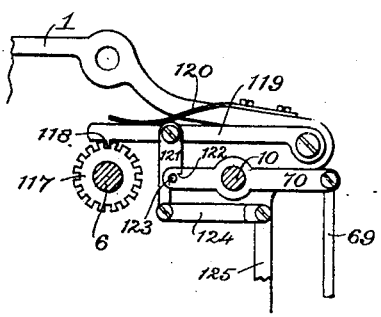
Figure 9:
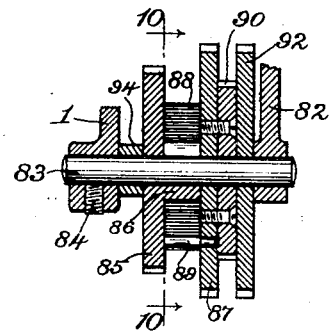
Figure 10:
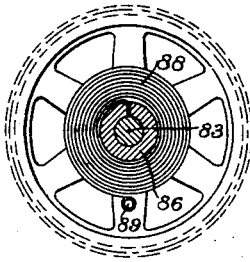
Figure 11:
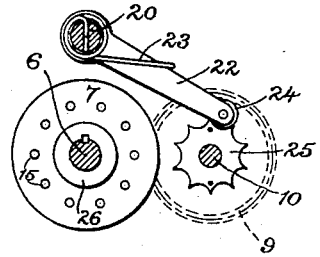
Figures 12, 13, 14:
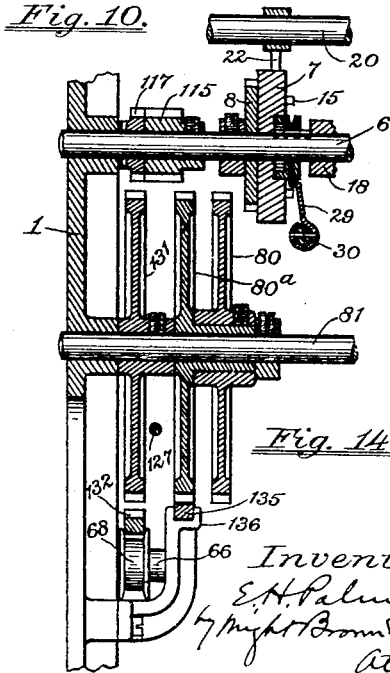

In the accompanying drawings, Figure 1 represents an embodiment of the invention as an attachment to a type-writing machine of the type known as "Remington," the latter being indicated only by dotted lines, parts of the present invention being shown in end elevation and others being indicated as in section on the line 1 1 of Fig. 3. Fig. 2 represents a plan of the upper parts of the mechanism with parts in horizontal section and parts of a Remington machine being indicated by dotted lines. Fig. 3 represents a rear elevation. Fig. 4 represents a sectional plan on line 4 4 of Fig. 1. Fig. 5 represents a detail elevation, partly in section on the line 5 5 of Fig. 2. Fig. 6 represents an elevation from the right-hand end of Fig. 3, omitting the bearing-bracket at the extreme right. Fig. 7 represents a detail section on line 7 7 of Fig. 1. Fig. 8 represents a detail elevation of the power-pawl and connections. Fig. 9 represents a section on line 9 9 of Fig. 6. Fig. 10 represents a section on line 10 10 of Fig. 9. Fig. 11 represents a detail elevation of one of the number-wheel-detent mechanisms. Figs. 12 and 13 represent, respectively, side and peripheral elevations of one of the number-wheels. Fig. 14 represents a detail section on the line 14 14 of Fig. 1.

Similar reference characters designate the same or similar parts throughout all the views.

The main frame of the attachment in the embodiment of the invention which is illustrated is composed of castings or brackets 1 1, connected together by certain shafts or rods hereinafter described and by cross-bars 2 2. Clamps by which this frame may be secured to the frame of a well-known form of type-writing machine are represented at 3, 4, and 5 in Figs. 1 and 2.

Referring to Figs. 1, 2, 3, 12, and 13, a shaft is represented at 6, which shaft supports the number-wheels 7. The number-wheels are loosely mounted upon the shaft 6. As shown in Figs. 2 and 3, there are nine of these number-wheels, spaced, as indicated in said figures, to provide for the punctuation of the work.

It will be readily understood that when an apparatus of this type is used in connection with a type-writing machine where the decimal-point will be employed and dividing-commas suitable spaces must be provided for such punctuation. With the spacing represented in Figs. 2 and 3 the two number-wheels at the left are for the cents-columns, the adjoining wide space at the right is to permit the writing of the period or decimal-point, the three number-wheels next in the same direction are for the dollars within the hundreds, the next wide space is for the next comma, the next three number-wheels for dollars in the thousands, the next wide space for the next comma, and the single wheel at the right is for dollars in the millions below ten. To the operator sitting at the opposite side of the machine from that indicated in Fig. 3 the arrangement would be in an order the reverse of that just described.

As the number-wheels and their immediate adjuncts are all practically the same, a description of one will be sufficient for all.

Each number-wheel 7 is loosely mounted, as above stated. Secured to one side of it is a pinion 8. Each pinion 8 meshes with pinion 9, which I call the "carrying-wheel" and which is mounted to rotate upon a stationary carrying-wheel shaft 10.

Adjacent to each pinion 9 a small gear 11 is secured upon the shaft 10. A pinion 12, mounted on a pin 13, which projects from the side of the carrying-wheel 9, meshes with gear 11 and carries a finger 14, adapted to engage one of a series of ten pins 15, which project in a circular series from the side of the number-wheel 7. It will be noticed that whenever a punctuation-space is left, as above described, the pinion or carrying-wheel 9 at the left of such space (see Fig. 2) does not directly carry a pinion 12 and finger 14. Instead, to bridge the space, such pinion 9 is carried at the left of a sleeve 16, which at the right-hand end carries a disk 17, and said disk in turn carries the pinion 12 and finger 14 for the first number-wheel at the right of said space.

The mechanism described for carrying ten from one number-wheel to the next highest is an important feature of my invention, as it not only gives an accelerated motion to the finger to move the adjacent number-wheel exactly one-tenth of a rotation, but it also leaves the number-wheel free to be moved according to its own units and is operative in either direction, so as to permit the operator to either add or subtract, as occasion may require, as will be more fully referred to hereinafter.

In Fig. 2 it will be noticed that spacing-sleeves 18 are secured on the shaft 6, as by set-screws 19, between some of the pinions 8 and certain clutches, which will be hereinafter described.

Means for holding the numeral-wheels in proper alined position after operation of any one or more of them are provided as follows: A rod 20 (see Figs. 1, 2, 3, and 11) is mounted in the upper portion 21 of the frame above the shaft 6. On said rod or shaft 20 are pivotally mounted detent-arms 22, one for each number-wheel mechanism. A spring 23, having one end secured in the rod 20 and having the other end bearing upon the upper edge of the arm 22, normally holds said arm downward, so as to press a roll 24, carried by said arm, into one of a plurality of recesses formed in the periphery of a disk 25, secured to the side of the pinion 9. This detent construction prevents any liability of the carrying-wheels or the number-wheels being moved beyond the desired point. Moreover, the line of detents preserves the uniformity of position of the series of number-wheels on their axes, so that the result, which is to be read at any time, may be seen in perfect alinement.

As has been stated, the number-wheels are all loose on the shaft 6. Means are provided, however, to temporarily connect either one of them with said shaft, so that when said shaft is to be rotated by the mechanism to be described the connected number-wheel will rotate one or more steps, it being understood, of course, that whenever one carrying-wheel rotates beyond the tenth unit it carries the ten to the next higher number-wheel through the pinion 8, carrying-wheel 9, pinion and finger 12 14, and one of the series of pins 15 on the next higher number-wheel. The means which I have shown to connect each number-wheel with the shaft 6 comprise a clutch member 26, splined on the shaft (see Fig. 2) and having teeth adapted to engage coacting teeth of a clutch member 27, formed by recessing the hub portion of the number-wheel 7, as clearly shown upon comparing Figs. 2 and 12. Each clutch is formed with a peripheral groove 28 to receive the shifting arm 29, (see Figs. 3 and 14,) which extends upward from the shaft 30, (see also Fig. 2,) having bearings in the cross-bars 2 2 and provided at one end with a crank-arm 31, having a wrist-pin and a roll 32 thereon. The clutch members 26 are all normally held toward the left (in Fig. 3) by means of springs 33, (see Figs. 1 and 2,) coiled on the shafts 30 and connected thereto and to a fixed part, such as one of the bars 2. Said springs normally tend to rock the shafts so that the clutch members 26 will be out of engagement with the clutch members 27 and the crank-arm rolls in their lower position.

To select the particular clutch which is to be actuated so as to cause a particular number-wheel to be rotated by the power mechanism and to control this selection by the position of the type-writer carriage along its usual slide rods or way, I employ the following mechanism: An upright finger 34 is mounted to slide on a fixed rod 35, (see Figs. 1 and 3,) the sleeve or hub of said finger having a pin or key fitting a longitudinal groove 35ª in said rod. The upper end of the finger 35 is beveled in both directions, so as to pass under and raise the rolls 32 when moving in either direction. When said arm stops under any roll, the rock-shaft carrying that roll is held in such position that its clutch member is in mesh with the clutch member of the selected number-wheel, and the latter is ready to be rotated when the shaft 6 is actuated. The arm 34 is moved lengthwise of the rod 35 by the movement of the type-writer carriage upon its usual guide-rods and stops when the carriage stops. The connections to produce these results are as follows: In Fig. 1, 36 represents the rear carriage-guide rod of a Remington, on which rod the arm 37 of the carriage slides, as usual. Said arm 37 is indicated by dotted lines in Figs. 1 and 2. In the present embodiment of my invention I utilize said ordinary arm 37 as the support or means of attachment to the carriage for a bracket 38, having a slot to receive a steel ribbon and a clamp 39 for fastening the ribbon in said slot. The steel-ribbon belt 40 is an endless one and is mounted on two pulleys 41 and 42, said pulleys having peripheral pins or studs 43, entering holes 44 in the belt to prevent slip of the belt on said pulleys. It will now be understood that the movement of the type-writer carriage in one direction produces a step-by-step rotation of the pulleys 41 and 42 through the medium of the belt 40; but said movement is slight, being only in accordance with the usual feed-ratchet of the type-writer. The amount of this movement must be multiplied in order to carry the clutch-selecting finger 34 the necessary distance from one to the other of the rolls 32, since it is practically impossible to arrange mechanical parts of the nature herein involved so close together as to be able to make use of such slight advances as are imparted to the ribbon 40. I therefore secure larger pulleys 45, so as to rotate with the pulleys 41 and 42 upon the shafts of the latter, said shafts being mounted in bearings 45$^a$, suitably supported by the end brackets of the frame. Loosely mounted upon the same shafts are two other pulleys 46 46 for a purpose hereinafter explained. An endless steel belt 47 is carried by the pulleys 45, and to the lower stretch of this belt is connected a bracket or arm 48, projecting laterally from the hub of the sliding cam-finger 34. (See Fig. 1.) The belt passes through a slot in said arm 48 and is held by a clamp 49. Through these connections the cam-finger 34 is caused to move simultaneously with the type-writing carriage and to actuate a clutch 26, stopping with the carriage and holding the particular clutch, so that the number-wheel that will be actuated when the shaft 6 turns will be the proper one for that particular figure which is imprinted in a column by the type-key.

I will now describe the means whereby the writing of a particular numeral by the type-writer will cause an equivalent rotation of the selected number-wheel.

In Fig. 1 a type-lever link, such as employed in the Remington machine, is shown at 50 in dotted lines. Similarly illustrated at 51 is a key-lever arm which connects with said link. Engaging the under side of the bent portion of the key-lever arm 51 is a lever 52, pivoted on the cross-rod 53, which lever I call the "front" lever. A rear lever 54, pivoted on a rod 55, has its front end provided with a screw 56, which bears upon the rear end of the lever 52. As indicated in Fig. 4, there are nine pairs of such levers, spaced substantially as are the key-levers of a type-writing machine, carrying or connected with the numeral keys or type. It will be noticed in Fig. 4 that the left-hand lever 52 is longer than the others. This is because the particular attachment shown herein is designed for use in connection with a Remington type-writer, in which the key rods or links are so arranged that in cross-section they would present a somewhat oval arrangement and in which the lower-case "l" key is used for writing the numeral "1" and in which the "l" key-link is arranged near the front of the machine, while the links for the other numerals are arranged in a substantially straight row at the back of the machine. Each lever 54 at its rear end receives through it the lower end of a link 57, screw-threaded at its lower end and provided with set-nuts 58 and 59 above and below the lever. Each link 57 at its upper end is pivotally connected with a stop-lever 60. (See Figs. 1 and 3.) Each stop-lever is pivotally mounted upon a shaft 61, from which a pin 62 projects into a slot 63, formed in the hub of the stop-lever. The slot 63 extends around only about one-fourth of the hub and is so positioned relatively to the pin 62 that the operation of any pair of levers 52 54 will oscillate the particular or selected lever 60 so as to elevate its inner end and owing to the contact of the upper end of the slot 63 with the pin 62 will oscillate the shaft 61; but when the other pins which project from said shaft 61 move downward they will not cause the oscillation of any of the other stop-levers 60, owing to the fact that said pins will simply move to the required distance along the slots 63 in the hubs of said levers. These stop-levers coact with the stop-fingers, which will be hereinafter described. Rigidly connected with one end of the shaft 61 is an arm 64, which is connected, by means of a short link 65, with one end of a lever 66, pivoted at 67 to the frame of the machine and having a roller 68 at its inner end to operate one of the racks, which will be presently described. A longer link 69 is pivotally connected with and depends from a lever 70, pivoted on the shaft 10. (See Figs. 3, 5, and 8.) The lower end of the link 69 passes through an opening in the outer end of the arm 64 and has its screw-threaded end provided with set-nuts 73. As will now be understood, the operation of any numeral-key of the writing-machine will cause the oscillation of one of the stop-levers and through the rod 61 will cause the arm 64 to operate both of the levers 66 and 70 through the links 65 and 69, respectively. As shown in Fig. 1, the upper end of the link 65 extends through the outer end of the lever 66 and is provided with a nut 74, between which and the top of the lever 66 is a spring 75. Said spring therefore insures that the upward pressure of the roller 68 against the under side of the rack-bar (to be described) will be a yielding one.

The stop-fingers which coöperate with the stop-levers 60 are shown at 76 in Figs. 1 and 3. They are rigidly connected with a shaft 77 to oscillate therewith. Said shaft, through connections which will be described, controls the amount of rotation which is imparted to the number-wheel shaft 6 by the power mechanism when the latter is released, and therefore the amount of rotation that will be imparted to the particular number-wheel that has been clutched to the said shaft 6 will be controlled by the particular stop-lever 60, which has been actuated as hereinbefore described. This is because the fingers 76 are, as shown, spaced to accord with the spacing of the levers 60 and extend in different radial directions from the shaft 77, forming a helical series. For instance, if the central lever 60 of the series of nine has been actuated by the type-lever having the numeral "6" the central finger 76 before it contacts with the raised inner end of said lever 60 will permit the rotation of the shaft 77 and of the number-wheel shaft 6 to just the amount required to cause any clutched number-wheel to increase the indication by six.

The above reference to the central lever 60 as being actuated by the type-lever having the numeral "6" applies to the embodiment of the invention here illustrated as applicable to a Remington machine. In such machines the numeral "1" is written by the use of the "1" key-lever, which is quite close to "9" key-lever. Referring to Fig. 3 of the drawings, the stop-finger 76 at the extreme right of said figure is the one to coact with the number "2" key-lever of the type-writer. The next toward the left is for the number "3" key-lever and so on until the next to the last at the left is for the number "9" key-lever. This latter appears short in Fig. 3; but by reference to Fig. 1 it will be seen that all of the fingers 76 are of the same length. The finger 76 at the extreme left in Fig. 3 is to coact with the stop-lever that is actuated by the "l" or number "1" key-lever, and it therefore projects from the shaft 77 at an angle more closely resembling that of the finger 76 at the extreme right (for "2") than the one which is next to it, (for "9".)

The stop-finger shaft 77 is provided with a gear 78, meshing with an idler-pinion 79, which in turn meshes with a large gear 80, that is mounted freely on shaft 81.

I will now describe the power mechanism and the connections by which it causes the gear 80, and consequently the shaft 77 and the stop-fingers 76, to be actuated.

Referring to Figs. 2 and 3, a bracket or extension of the frame is shown at 82. Mounted in said bracket and in the adjacent end piece 1 of the frame is a shaft 83, which I will hereinafter refer to as the "power-shaft." Said shaft is more fully shown in Figs. 6, 9, and 10. It is fixed in its bearings, as by a set-screw 84. Mounted loosely on the shaft 83 is a ratchet-wheel 85. Also loosely mounted on said shaft is a gear 87, separated from the wheel 85 by the hub 86 of the latter. A spring 88, which I call a "power-spring" in this embodiment of the invention, is connected at one end to the hub 86 and at the other end to a pin 89, projecting from the gear 87. Secured to the gear 87 is a ratchet 90, the teeth of which are engaged by a pawl 91, (see Fig. 6,) attached to and carried by the side of a gear 92, loosely mounted on shaft 83. (See Figs. 3 and 9.) The power-spring is wound up automatically by each reverse movement of the type-writer carriage, as will presently be explained. To place said spring under the necessary preliminary tension or to increase such tension, I provide a lever 93, having its hub 94 mounted on the shaft 83, said lever having a pawl 95 engaging the teeth of ratchet 85. (See Fig. 6.) A suitable detent-pawl 95$^a$ is indicated in Figs. 3 and 6.

The connections for producing the automatic winding of the power-spring just mentioned are as follows: By comparing Figs. 2 and 6 it will be seen that the gear 87 meshes with a gear 96. The latter is fast on a short shaft 97, and secured on the outer end of said shaft is a band-wheel 98. A steel strip 99 is secured at one end to said wheel 98, is wound several times thereon and passes up over an endless steel band 100, which is placed on the large band-pulleys 46 46. The strip 99 extends above the upper stretch of the band 100 and is attached thereto, as by a rivet 101. A sleeve 102, slidingly fitted to the guide-rod 35, (see Fig. 2,) is provided with an arm or bracket 103, (see Fig. 1,) having a slot which receives the lower stretch of the band 100, the latter being held in said slot by a clamp 104.

The carriage of a type-writing machine during the writing travels with a step-by-step movement in the direction of the arrow in Fig. 2. It will therefore be understood that the upper stretches of the belts 40 and 47 move in the same direction and the lower stretches in the opposite direction. The sleeve of the clutch-selecting finger 34 moves away from the sleeve 102 on the rod 35, and therefore offers no opposition to the following movement of the sleeve 102 as the power-spring unwinds and causes a pull upon the steel strip 99; but when the type-writer carriage is shifted to begin a new line the sleeve of the finger 34 contacts with the sleeve 102 and pushes it toward the right in Fig. 2, thus causing the upper stretch of the band 100 to move toward the left and pull the strip 99 with it, and so wind up the power-spring through the pulley 98, gears 96 and 87, and pin 89.

As has been stated, the movement of the belt 40 is slight, as it only follows the step-by-step movement of the type-writer carriage when the keys of the latter are operated; but the movement imparted thereby to the belt 47 is much greater, owing to the relative sizes of the pulleys of the two belts. Since the clamp 39 is connected to the upper stretch of belt 40, while the finger 34 is operated by connection with the lower stretch of belt 47, the said finger 34 always moves in a direction opposite to the direction of travel of the type-writer carriage and to a much greater extent. The sleeve 102 slides on rod 35 and is clamped to the lower stretch of the band 100, which is so connected to the power-spring mechanism that the sleeve 102 follows the movements of finger 34 when the latter moves away from it and when the power is released. If the finger 34 is moved to the left from the position shown in Fig. 2, the sleeve 102 will only follow it to a slight degree regardless of the particular numeral that is operated, because the gearing of the power mechanism is such as to impart all the necessary movement to the parts actuated thereby, while the movement of the band 100 and the sleeve 102 is but slight. Said sleeve is only of use to enable the return movement of the type-writer carriage to restore to the spring the power which it has given up.

The relative arrangement and connections are such, according to the width of the sheet of paper used in the type-writer carriage or the width of the space on such sheet that is to be printed upon, that when the sleeve of the finger 34 has pushed the sleeve 102 as far toward the right in Fig. 2 as it can be moved one margin of the writing-space on the sheet of paper has been reached.

The force of the power-spring is partly expended in operating the number-wheels, and I will now describe the connections for doing this.

The power-spring acts through the gear 87, its attachment-ratchet 90, and the pawl 91 to rotate the gear 92 when the latter is permitted to move, the pawl 91 being employed to enable the gear 87 to be rotated to wind up the spring as described without affecting the gear 92. Said gear 92 meshes with an idler-pinion 105, (see Fig. 6,) which in turn meshes with a gear 106, fast on a shaft 107, which I term the "reverse-shaft." Said shaft 107 has bearings in the frame members 82 and 1 and extends inside the latter and on its inner end are loosely mounted two gears 108 and 109. (See Fig. 7 in connection with Figs. 2 and 3.) Splined on the shaft 107 between the gears 108 109 is a toothed clutch 110, adapted to connect with clutch-teeth formed on the inner sides of said gears 108 109. The clutch is shifted so as to cause the shaft 107 to rotate either of the gears 108 109 by means of a sliding rod 111, having its bent end engaging a groove in the clutch 110 in a common manner, the other end of the rod 111 being pivotally connected with a lever 112, which is pivoted to a bracket 113, secured to the frame, and has its free end adapted to engage either one of two retaining-notches in a fixed plate 114. The gear 109 meshes with a spur-gear 115, which is fast on the number-wheel shaft 3, while the gear 108 meshes with an elongated idler-pinion 116, which in turn meshes with said gear 115. It will now be obvious that the number-wheel shaft will be actuated in one direction or the other, according to whether power reaches it from the shaft 107 through the gears 108, 116, and 115 or through the gears 109 and 115, and it will also be obvious that the shifting of the clutch 110 between the gears 108 and 109 controls the direction in which the number-wheel shaft 6 is rotated, and consequently whether the number-wheel that is temporarily clutched to said shaft 6 shall indicate addition or subtraction.

To prevent the power mechanism from operating the number-wheel shaft 6 until desired, a notched wheel 117 is secured upon said shaft. (See Figs. 2 and 8.) A detent or stop pawl or tooth 118, carried by a lever 119, is normally held in one of the recesses or notches of the wheel 117 by a spring 120, secured to the frame and bearing on the top of the lever 119. Pivotally connected with the lever 119 is a vertical link 121, having a shoulder 122 engaging a pin 123, carried by the lever 70. As has been described herein, each operation of a key of the type-writer results in a downward movement of the long link 69, connected to the lever 70. It will be readily understood, therefore, that such movement causes the release of the notched wheel 117 and permits the power mechanism to rotate the number-wheel shaft 6 and the selected number-wheel to the extent permitted by the coaction of a stop-lever 60 and a stop-finger 76.

As most clearly shown in Fig. 5, the lower end of the vertical link 121 is connected by a horizontal link 124 with the upper end of a lever 125, pivoted at 126 to the frame and having its lower end connected by a link 127 with a clip 128, (see Fig. 1,) engaged by the shift-rail 129 of the type-writer. This construction permits the usual "upper-case" letters or characters on the numeral type-levers to be used without causing the actuation of the lever 119 and the consequent release of the power mechanism. This is due to the fact that in the Remington machine, to which this particular embodiment of my invention is applied, the shift-rail 129 moves in the direction of the arrow $b$ in Fig. 1 when the upper-case letters or characters on the numeral type-levers are to be used. Such movement of the shift-rail causes the link 127 to actuate the lever 125, which, through the link 124, will swing the vertical link 121 so that the shoulder 122 slips off from the pin 123 of the lever 70. Hence although the levers 52 and 54 and the connections, including the link 69, may cause the movement of the lever 70 yet said lever 70 will not cause the lever 119 to be raised. The means for automatically connecting up the power to operate the gear 80 and the stop-finger shaft 77 comprise the following parts: Secured to the reverse-shaft 107, above described, is a pinion 130. (See Figs. 2 and 7.) Said pinion 130 meshes with a gear-wheel 131, which is fast on the shaft 81 and which I refer to as the "control-wheel." Below the gear-wheel 131 is a rack 132, (see Figs. 1, 3, and 14,) having a pivot-pin 133, extending into a horizontal guide-slot 134, (see also Fig. 5,) formed in a bracket attached to the side of the machine. The other end of said rack 132 rests upon the roller 68, hereinbefore described as carried and adapted to be elevated by the lever 66. The pivot-pin 133 connects with one end of a sliding rack 135, the front end of which fits a guide formed in a bracket 136, supported by the frame. (See Figs. 1 and 3.) Said rack 135 is constantly in mesh with a gear-wheel 80$^a$, secured to the hub of the gear 80. Both gears 80 and 80$^a$ are loosely mounted on the shaft 81. Since the two racks 132 and 135 when reciprocated must move in unison, owing to the pin connection 133, it will be evident that when the depression of a type-key lever causes the roller 68 to elevate the rack 132 into mesh with the control-wheel 131 and is reciprocated thereby the rack 135 must cause the gears 80 and 80$^a$ to oscillate, and therefore cause the oscillation of the stop-finger shaft 77 through the gears 79 and 78.

In order that the operative parts of the above-described attachment may be quickly disconnected to enable the type-writing machine to be used by itself in its entirety, I mount the shaft 55 in short vertical slots 137 in the frame, as shown in Fig. 1. Above the shaft 55 is a rock-shaft 138, having segmental arms 139, (see Fig. 6,) having slots 140, which are eccentric to the shaft 138. The ends of the shaft 55 extend through the eccentric slots 140. To disconnect the attachment for the purpose mentioned, the handle 141 is depressed, thus causing the eccentric slots 140 to elevate the shaft 55, so that the bearing-screws 56 of the levers 54 are raised sufficiently to carry them above the radius of action of the levers 52. At the same time the clamp 39 will be released from the steel band 40.

In the operation of the type-writer and the attachment when the latter is connected up the type-writer carriage will be moved until the finger 34 throws in the number-wheel clutch of the desired denomination, and then the type-writer will be used in the usual manner to imprint upon the sheet of paper employed the desired numerals and punctuation. The downward movement of the type-writer key-lever is communicated to the levers 52 and 54, and during the first half of such movement the link 57 oscillates the stop-lever 60 and also raises the roll 68, which brings the pivoted rack 132 into mesh with the control-wheel 131. During the last half of such movement the tooth 118 of the lever 119 is released from the detent-wheel 117 on the number-wheel shaft 6. This division of movement is permitted by means of the spring 75, interposed between the top of the roll-lever 66 and the nut 74 on the upper end of the link 65. The power-spring, through the train of gearing connecting it with the stop-finger shaft 77, turns the latter to the extent permitted by the particular stop-lever 60 which has been actuated, and also turns the selected or clutched number-wheel to the corresponding extent, which will of course accord with the numeral of the key-lever that is operated. The first half of the upward movement of the key-lever when released drops the tooth 118 into a notch of the detent-wheel 117, and the second half of such movement results in the disconnection of the pivoted rack from the control-wheel 131 and allowing the stop-finger shaft 77 to be returned to original position by the action of a spring 142. Said spring 142 is shown in Fig. 3 as coiled around one end of the shaft 77 and connected thereto and to the frame. A spring 143, which is similarly connected to and actuates the shaft 61, returns the latter and the stop-lever 60, which has been actuated, to their normal positions.

As hereinbefore described, the mechanism illustrated provides for subtraction as well as addition, according to the position of the clutch 110, which is shifted by the lever 112. Therefore if the operator has made a mistake in the numeral which has been added the error can be corrected quickly by temporarily shifting the lever 112, operating the proper key-lever to reverse the number-wheel the necessary number of units, then erasing the incorrect numeral from the paper, and then making the correct impression and addition. This same feature of reversal for subtraction provides for the quick return of any or all of the number-wheels to zero.

While I have illustrated and described this invention as an attachment having some of its features so arranged that it is to be operated by a Remington type-writer, it is to be understood that I do not limit myself to such use or adaptation. Obviously the invention may be used by itself as a calculating-machine, all such parts of a type-writing machine as are not herein shown or described being omitted, or the levers 52 might be directly actuated by the fingers of the operator without utilizing any parts of a type-writing machine. Furthermore, it is to be understood that such minor changes as would be necessary to adapt this calculating-machine for use in conjunction with other type-writers than the Remington may be made without departing from the principle and scope of my invention.

I claim—

1. A calculating attachment for type-writing machines, comprising number-wheels, a motor, connections whereby said number-wheels may be actuated by the motor under the control of the key-levers of a type-writer and means whereby the direction of movement imparted to the number-wheels may be reversed, the said attachment being independent of the type-writing machine to enable the latter to be used without the attachment.

2. A calculating attachment for type-writer machines, comprising a shaft, number-wheels loose thereon, individual clutches for connecting the number-wheels to said shaft, power mechanism for actuating said shaft, and connections whereby power may be stored by a movement of the carriage of a type-writing machine.

3. A calculating attachment for type-writing machines, comprising number-wheels, a shaft therefor, a motor for actuating the shaft, said number-wheels being loose on the shaft, means for individually clutching a number-wheel to the shaft, and connections whereby the operation of a key-lever of the type-writing machine will effect the clutching of a number-wheel to the shaft and the actuation of said shaft by the motor, the said attachment being independent of the type-writing machine to enable the latter to be used without the attachment.

4. A calculating attachment for a type-writing machine, comprising a plurality of number-wheels, means for actuating either of them, connections adapted to be coupled with the carriage of such machine to control the selection of a number-wheel to be actuated according to the position of such carriage, and a spring-power mechanism for actuating either number-wheel that is selected, the operative parts of said attachment being capable of disconnection from the type-writing machine to enable the latter to be used alone in its entirety.

5. In an apparatus of the character described, the combination with a shaft and means for rotating it, of a plurality of number-wheels loosely mounted on said shaft and each having a hub portion recessed to form teeth, clutches splined on the shaft and having teeth to engage said number-wheel teeth, and means for moving either of said clutches to cause it to engage the teeth of its adjoining number-wheel.

6. In an apparatus of the character described, the combination with a shaft and means for rotating it, of a plurality of number-wheels loosely mounted on said shaft and each having a hub portion recessed to form teeth, clutches splined on the shaft and having teeth to engage said number-wheel teeth, and means for moving either of said clutches to cause it to engage the teeth of its adjoining number-wheel, said means comprising rock-shafts having arms engaging the clutches and an actuator for operating the rock-shafts and holding either one in position for retaining its clutch in connected position.

7. In an apparatus of the character described, the combination with a shaft and means for rotating it, of a plurality of number-wheels loosely mounted on said shaft and each having a clutch member, clutches on said shaft and adapted to individually connect the number-wheels to said shafts, rock-shafts having arms to engage the clutches and having also crank-arms, a slide provided with a finger adapted to successively engage the crank-arms, and means for actuating said slide.

8. In an apparatus of the character described, the combination with a shaft and means for rotating it, of a plurality of number-wheels loosely mounted on said shaft and each having a clutch member, clutches on said shaft and adapted to individually connect the number-wheels to said shafts, rock-shafts having arms to engage the clutches and having also crank-arms, a guide-rod extending past the crank-arms, an upright finger mounted to slide on said rod and having its end beveled in opposite directions and adapted to engage the crank-arms to oscillate the rock-shafts, and means for moving said finger along the guide-rod.

9. In an apparatus of the character described, the combination with a rotary shaft, of number-wheels loose thereon, clutches for connecting the number-wheels with the shaft, means for actuating said clutches one at a time, said means including a slide and connections whereby it will actuate either one of the clutches, two pulleys, a belt on said pulleys, said slide being connected to one stretch of the belt, and means for imparting motion to said belt.

10. In an apparatus of the character described, the combination with a rotary shaft, of number-wheels loose thereon, clutches for connecting the number-wheels with the shaft, means for actuating said clutches one at a time, said means including rock-shafts provided with crank-arms and with arms engaging the clutches, a guide-rod, a slide thereon and having a finger adapted to engage the crank-arms successively, said slide having a clamp, two pulleys, a belt on said pulleys and having one stretch engaged with said clamp, and means for moving said belt.

11. In an apparatus of the character described, the combination with a plurality of number-wheels and means including clutches for actuating them, clutch-operating devices, an actuator for said clutch-operating devices, two shafts each having a large pulley and a small pulley connected to rotate together, a belt on the large pulleys and a belt on the small pulleys, a clamp connecting one stretch of the longer belt with the clutch-actuator, and a clamp for connecting the shorter belt with a portion of a type-writer carriage.

12. In an apparatus of the character described, the combination with a plurality of number-wheels, of means for actuating them, said means including a set of front levers and a set of rear levers, the latter being connected with the number-wheel mechanism and the former being adapted to be actuated by the numeral key-levers of a type-writing machine, and means whereby one set of levers may be separated from the other set.

13. In an apparatus of the character described, the combination with a plurality of number-wheels, of means for actuating them, said means including an oscillatory and helically-arranged series of stop-fingers for controlling the amount of movement of the number-wheels, a plurality of stop-levers, and connections whereby either one of said stop-levers may be moved into the path of movement of a stop-finger.

14. In an apparatus of the character described, the combination with a plurality of number-wheels, of means for actuating them, said means including an oscillatory and helically-arranged series of stop-fingers for controlling the amount of movement of the number-wheels, a plurality of stop-levers, and connections whereby either one of said stop-levers may be moved into the path of movement of a stop-finger, said connections including levers adapted to be actuated by the numeral key-levers of a type-writing machine.

15. In an apparatus of the character described, the combination with a plurality of number-wheels of means for actuating them, said means including a series of stop-fingers for controlling the amount of movement of the number-wheels, a plurality of stop-levers, a shaft on which said stop-levers are loosely mounted, said shaft having pins and said stop-levers having slots receiving said pins, power mechanism adapted to be released by the actuation of said shaft, and connections whereby either one of said stop-levers may be moved into the path of movement of a stop-finger.

16. In an apparatus of the character described, the combination with a power-spring and connection whereby it may be wound up by movement of a type-writer carriage, of a shaft connected to receive power from said spring, an oscillatory shaft having a helical series of arms, connections whereby the latter shaft may receive motion from the former, a stop-finger for each of said arms normally out of the path thereof, and means for oscillating either of the fingers into the path of one of said arms and simultaneously permitting the spring to actuate the said oscillatory shaft.

17. In an apparatus of the character described, the combination with a power-spring, of an endless belt and connections whereby a reciprocal motion may be imparted thereto by the movements of a type-writer carriage, a strip connected at one end to said belt, and connections between the other end of said strip and the spring whereby a pulling movement of the strip will store power in said spring.

18. In an apparatus of the character described, the combination with a power-spring, of an endless belt, connections between one stretch of said belt and the spring whereby movement of the former in one direction will store power in the spring, a guide-rod, a slide on said rod and clamped to the other stretch of said belt, a second slide on said rod adapted to push the first-mentioned slide in one direction, and connections whereby the second slide may be actuated by the carriage of a type-writing machine.

19. In an apparatus of the character described, the combination with a single power-spring, of a shaft, intermediate connections under the control of the operator whereby the shaft may be rotated by the spring in either direction, number-wheels loose on said shaft, and means whereby either one may be temporarily connected to the shaft to be actuated by said spring through the medium of said shaft.

20. In an apparatus of the character described, the combination with a power-spring, a shaft driven thereby, two gears loose on said shaft, means for connecting either gear with said shaft, a number-wheel shaft, and two trains of gearing connecting the latter with the said two gears, one train having one more gear than the other, whereby the number-wheel shaft may be actuated in either direction by the power-spring.

21. In an apparatus of the character described, the combination with a power-spring, of a number-wheel shaft having a toothed wheel and adapted to be actuated by the spring, a stop-lever having a spur engaging the toothed wheel, a vertical link connected with the stop-lever and having a shoulder, a lever having a pin engaging said shoulder, lever-actuated connections for operating the pin-carrying lever, and connections whereby the said vertical link may be actuated by the shift-rail of a type-writer carriage.

22. In an apparatus of the character described, the combination with two gear-wheels in axial alinement, of a rack for each gear, the two racks being pivotally connected together at one end, one rack being permanently engaged with one gear and the other rack normally separated from its gear, power mechanism for driving one gear, and means under the control of the operator for causing engagement of the separated gear and rack, whereby motion may be transmitted through said gears at the will of the operator.

In testimony whereof I have affixed my signature in presence of two witnesses.

EDWARD H. PALMER.

Witnesses:
SAMUEL G. STEPHENS,
A. D. HARRISON.